United States Patent
Tournayre et al.

(10) Patent No.: US 10,703,684 B2
(45) Date of Patent: Jul. 7, 2020

(54) CULTIVATION MEDIUM PRESENTING WATER AVAILABILITY COMPARABLE TO THAT OF A PEAT

(71) Applicant: Florentaise, Saint Mars du Desert (FR)

(72) Inventors: Laurent Tournayre, Aubenas (FR); Eric Beaudet, Savennieres (FR)

(73) Assignee: FLORENTAISE, Saint Mars du Desert (FR)

( * ) Notice: Subject to any disclaimer, the term of this patent is extended or adjusted under 35 U.S.C. 154(b) by 87 days.

(21) Appl. No.: 15/647,422

(22) Filed: Jul. 12, 2017

(65) Prior Publication Data
US 2017/0305802 A1    Oct. 26, 2017

Related U.S. Application Data

(62) Division of application No. 14/313,485, filed on Jun. 24, 2014, now abandoned.

(30) Foreign Application Priority Data

Jun. 20, 2014 (EP) .................................... 14305960

(51) Int. Cl.
*C05F 11/00* (2006.01)
*A01G 24/00* (2018.01)
*C09K 17/52* (2006.01)

(52) U.S. Cl.
CPC .............. *C05F 11/00* (2013.01); *A01G 24/00* (2018.02); *C09K 17/52* (2013.01)

(58) Field of Classification Search
CPC .......... C05F 11/00; A01G 24/00; C09K 17/52
See application file for complete search history.

(56) References Cited

U.S. PATENT DOCUMENTS

| | | | | |
|---|---|---|---|---|
| 2009/0253943 A1* | 10/2009 | Edwardson | .......... | A61K 36/185 568/817 |
| 2013/0075509 A1* | 3/2013 | Beaudet | .................... | D21B 1/30 241/236 |
| 2015/0344390 A1* | 12/2015 | Soum | ....................... | C07C 37/72 549/457 |

FOREIGN PATENT DOCUMENTS

RU    2298313 C1 *    5/2001

* cited by examiner

*Primary Examiner* — Jennifer A Smith
(74) *Attorney, Agent, or Firm* — Adenike Adebiyi

(57) ABSTRACT

A bark-based composition having at least 70% by volume of bark is defibrated in order to make cultivation media having water availability that is greater than or equal to 250 mL/L.

11 Claims, 3 Drawing Sheets

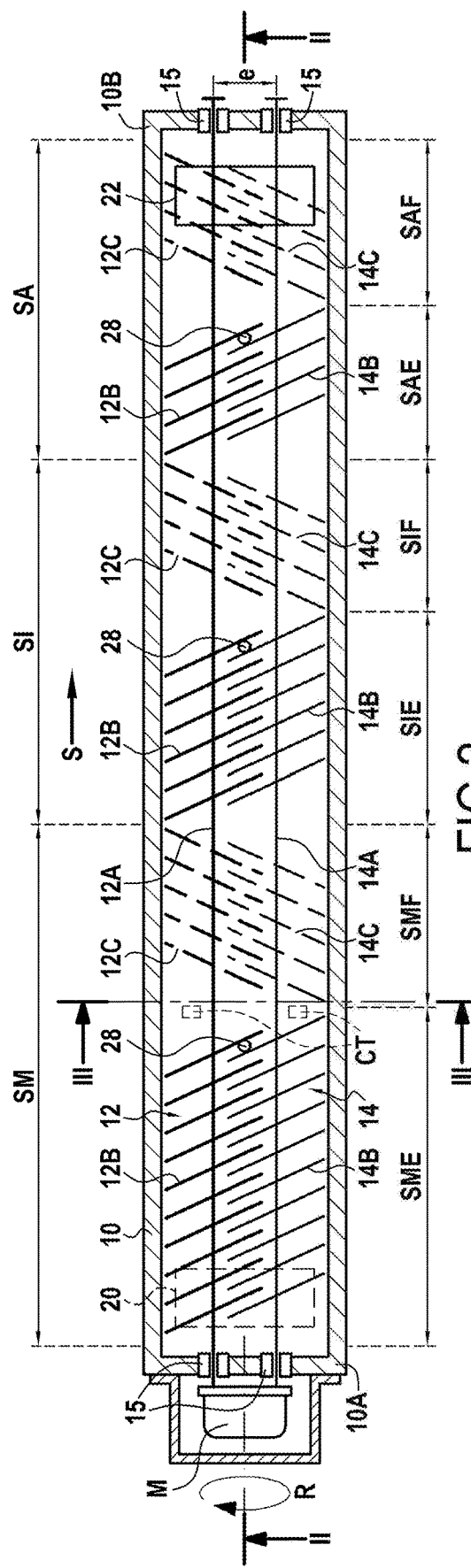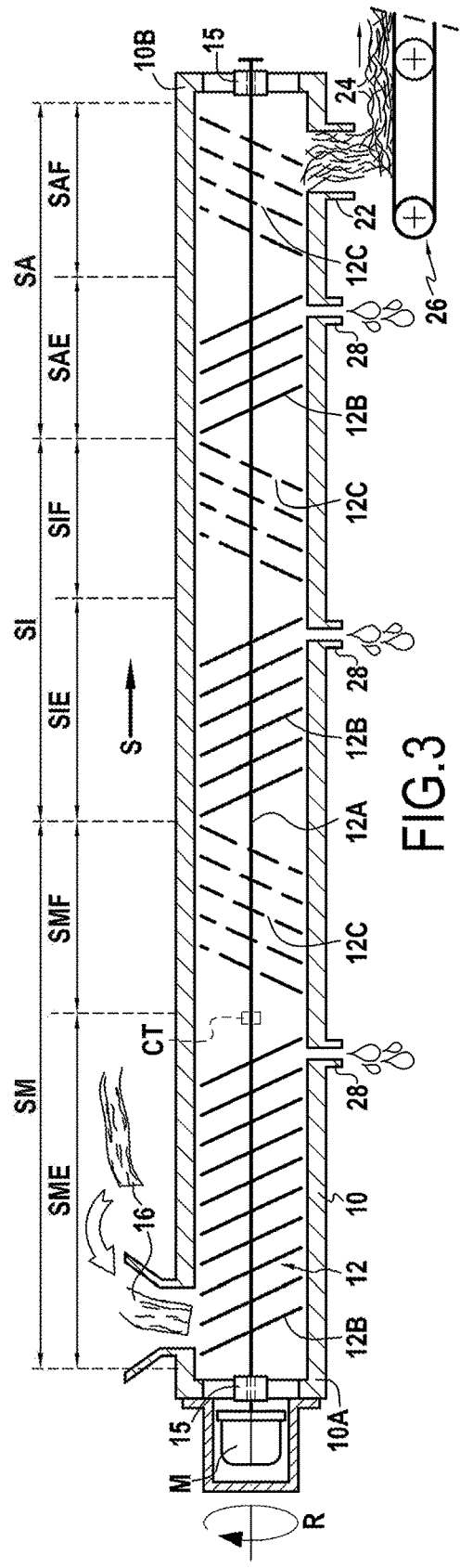

CULTIVATION MEDIUM PRESENTING WATER AVAILABILITY COMPARABLE TO THAT OF A PEAT

CROSS-REFERENCE TO RELATED APPLICATIONS

This application is a divisional of U.S. patent application Ser. No. 14/313,485, filed 24 Jun. 2014, which claims priority to European Patent Application No. 14305960.9, filed 20 Jun. 2014.

GENERAL TECHNICAL FIELD

The present invention relates to the manufacturing of cultivation substrates having properties, in particular water availability, that are similar to those of peat.

STATE OF THE ART

Among cultivation media or the components of cultivation media, peats are highly valued because of their water availability, which represents the water that can be stored by a substrate and that can be extracted easily by the roots of most conventional horticultural plants. It may also be referred to by the terms "useful storage" or "easily usable storage".

However, peats have considerable drawbacks. Peats are made up of organic material from wetlands, frequently in fragile and protected zones. Peats are present only in certain areas of the world, which is problematic for shipping because they need to be transported over long distances. In addition, their formation process is very slow, and they thus cannot be regarded as renewables. In addition, the extraction methods commonly used release considerable quantities of carbon and greenhouse gases.

All of those drawbacks imply that peat-substitution materials have been sought after for many years, and in particular materials having water availability similar to that of peats.

Among the numerous materials that have been the subject of studies, none have water availabilities comparable to those of peats, e.g. in the range 250 milliliters (mL) to 400 mL per liter (L) of substrate.

Water availability, expressed as the ratio of the volume of water over the volume of cultivation medium, corresponds to the water released at capillary capacities in the range −1 kilopascal (kPa) and −10 kPa; measurement is performed using the methodology defined in the standard EN 13041 with suction of 10 centimeters (cm) and a water height of 100 cm.

Several methods of treating wood shavings and chips have thus been proposed in order to obtain such water availability values, but without success. Although the substrates obtained have relatively high water retention, their water availability remains insufficient, and other properties such as porosity and air content are promoted.

Ground and screened bark-based substitutes have also been proposed, in order to make use of the advantages of barks compared to wood, namely greater resistance to biodegradation, and greater water retention. Bark is thus generally ground and screened to obtain particle size fractions lying in the range 0 millimeters (mm) to 40 mm, which makes it possible to obtain advantageous drainage and aeration capacities, but remains insufficient in terms of water availability.

Fine grinding of bark has been proposed, but poses problems in terms of controlling and reproducibility of particle size, and in terms of macro pores becoming clogged because of the finest particles migrating during cultivation.

Composting barks makes it possible to improve the resulting water availability, but without making it possible to reach values close to those of peats. In addition, composting is a process presenting several drawbacks, among which mention may be made of: a stock immobilization over a considerable period; losses of organic matter; non-reproducibility; and the need for dedicated infrastructures requiring considerable investment.

Document FR 2 900 923 describes a method of obtaining a cultivation medium using bark. Although, that document describes the acquisition of advantageous characteristics: pH; high absorption capacity; and low apparent density; those characteristics are common to numerous materials used for making cultivation media, and the method described in that document does not mention the water availability values.

PRESENTATION OF THE INVENTION

The present invention thus aims to provide a cultivation medium having water availability that is comparable with the water availabilities of peats.

To this end, the present invention provides a cultivation medium characterized in that it is made by defibration of a bark-based composition comprising at least 70% by volume of bark, said cultivation medium having water availability that is greater than or equal to 250 millimeters per liter (mL/L).

The bark-based composition typically comprises 100% by volume of bark, and comprises:
  a fine fraction, corresponding to particles smaller than 100 micrometers (μm), that is less than 10%;
  a medium fraction, corresponding to particles lying in the range 100 μm to 1000 μm, that is greater than 50%; and
  a coarse fraction, corresponding to particles lying in the range 1000 μm to 10,000 μm, that is less than 40%.
  In a variant;
  the fine fraction is less than 5%;
  the medium fraction is greater than 60%; and
  the coarse fraction is less than 30%.
  The bark-based composition comprises at least 80% by volume of bark.
  The remaining volume of the bark-based composition is typically wood.
  By way of example, the bark is the outer bark from woody plants.

The invention also provides a method of treating a bark-based composition, in which the bark-based composition is defibrated, said bark-based composition comprising at least 70% by volume of bark, in order to make cultivation media having water availability that is greater than or equal to 250 mL/L.

The bark-based composition comprises at least 80% by volume of bark.

The remaining volume of the bark-based composition is typically wood.

By way of example, the bark is the outer bark from woody plants.

The bark-based composition is typically defibrated by raising temperature and by compression, e.g. by means of an auger machine or any other device or method.

The method may also include a step of grinding and screening the bark-based composition, in such a manner that the bark-based composition to be extruded has a particle size of 25 mm to 40 mm.

In a variant, the composition to be extruded has a particle size of 10 mm to 25 mm.

PRESENTATION OF THE FIGURES

Other characteristics, aims and advantages of the invention appear from the following description, which is purely illustrative and non-limiting, and that should be read with reference to the accompanying drawings, in which:

FIGS. 2 to 4 show an example of an installation for performing a method according to an aspect of the invention.

In all of the figures, elements that are the same are identified with identical numerical references.

DETAILED DESCRIPTION

Figure 1:
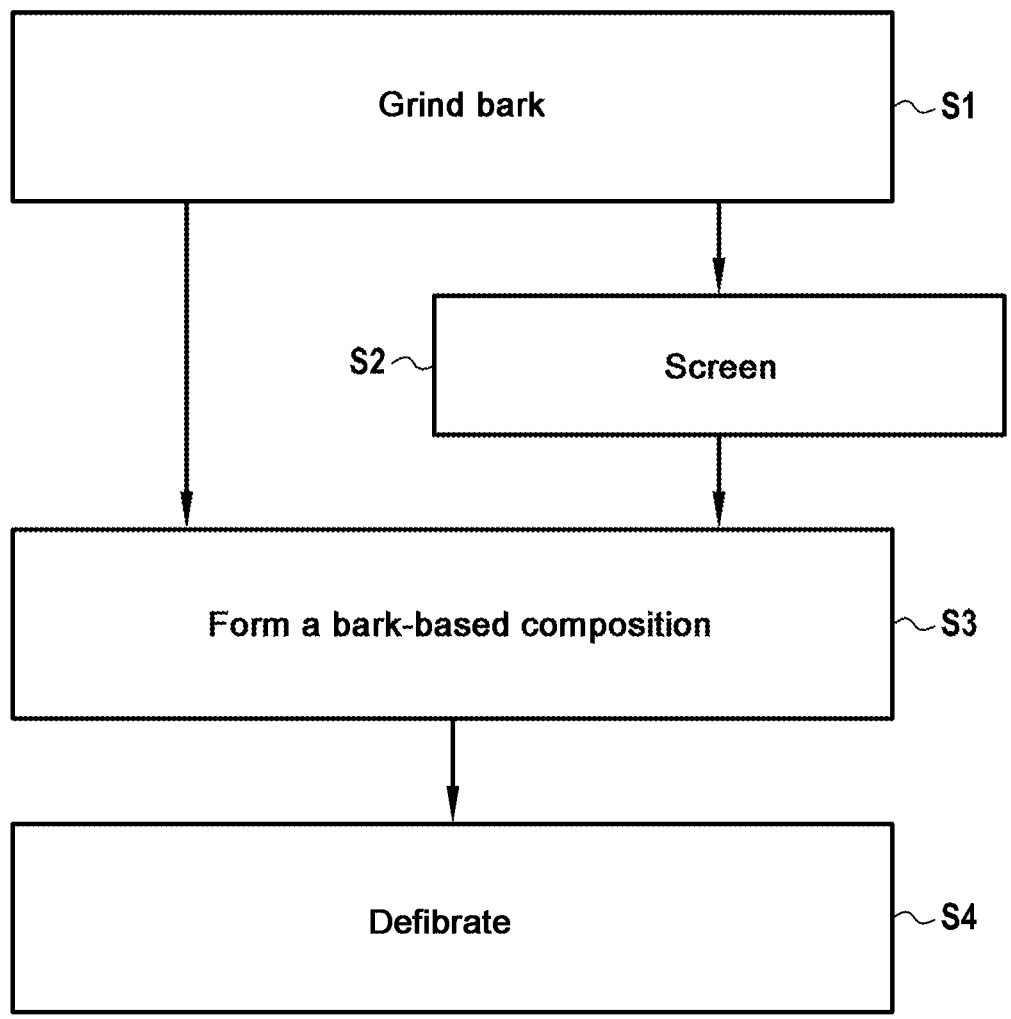
FIG. 1 is a diagram showing an example of a method according to an aspect of the invention.

FIG. 1 is a diagram showing an example of a method according to an aspect of the invention.

In an optional first step S1, the bark is ground, the bark typically being from conifers.

In an optional second step S2, the ground bark is screened in such a manner as to obtain bark presenting a determined particle size. It is thus sought to obtain a bark comprising particles lying in the range 5 mm to 40 mm. The bark typically presents particle size of 25 mm to 40 mm, or particle size of 10 mm to 25 mm. This optional second step S2 may be performed following the optional first step S1, and may also be performed independently of the optional first step S1.

In a third step S3, a bark-based composition is formed. The bark-based composition is formed by bringing together bark, typically bark from conifers, which is then typically combined with wood, e.g., wood chips or shavings.

The bark forms at least 70% by volume of the bark-based composition, or by way of example, at least 80% by volume, or even more precisely at least 90% by volume of the bark-based composition, or even at least 95% by volume of the bark-based composition. The remaining volume of the bark-based composition is typically wood.

The bark-based composition may be constituted by 100% bark.

Other types of bark may be used. As a function of the nature of the bark, for example for hardwood bark, it may be necessary to perform a preliminary step of phyto-toxicity treatment.

In a variant, the optional grinding as well as the optional screening may be performed after the step S3 of forming the bark-based composition.

In a fourth step S4, the bark-based composition is defibrated, e.g. by extrusion by means of a machine, typically an auger or worm-screw machine, in such a manner as to compress and raise the temperature of the bark-based composition.

An example of a machine that may be used to perform said defibration is presented below, it being understood that defibration may be performed by means of other machines or methods.

Figure 4:
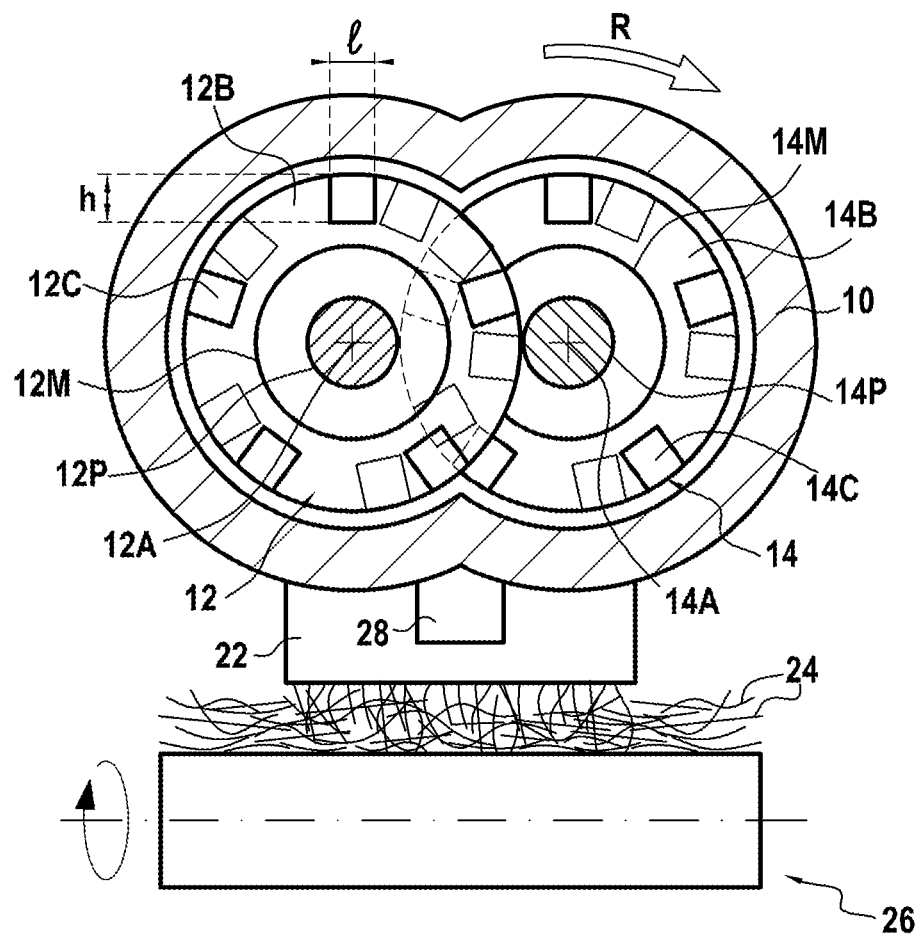

FIGS. 2 to 4 show an example of a machine making it possible to implement a method according to an aspect of the invention.

FIG. 2 is a diagrammatic plan view of a defibration installation making it possible to implement the method of the invention, with the wall of the sheath being cut-away.

FIG. 3 is a diagrammatic view corresponding to a view of the FIG. 1 installation in section on plane II-II of FIG. 2, with the portions of the screw 14 that are present in this plane being omitted.

FIG. 4 is a view in section on line III-III of FIG. 2.

The installation shown in the figures comprises a sheath 10 in which two screws 12, 14 are disposed that mesh with each other, thus forming an auger extrusion machine. The distance e between the axes of the two screws is less than the outside diameter of their threads. The shafts 12A and 14A of the screws 12 and 14 are driven in rotation by a motor M and are mediumed in rotation by bearings, such as the bearings 15.

As can be seen more clearly in FIG. 4, the outside wall of the sheath has the shape of two intersecting cylinder segments, each of which is adapted to match the diameter of the screws 12 and 14. Preferably over its entire length, the sheath has an opening cover that forms one of its longitudinal walls and serves to enable maintenance and jam-clearing to be performed on it, if necessary.

The bark-based composition 16 that is to be defibrated, i.e. reduced to fibers, is loaded into the sheath via a feed 20 situated at the upstream end 10A of the sheath and, for example, being in the form of a hopper situated on the top face of the sheath, into which the bark-based composition is brought by any suitable means, e.g. by a screw conveyor (not shown).

At its downstream end 10B, the sheath has an outlet 22. For example, the outlet is constituted by a chute situated on the bottom face of the sheath and allowing the fibers 24 to fall by gravity onto the belt conveyor 26. The conveyor may be equipped with a tunnel (not shown), ventilated with a gas, such as air (preferably filtered air), so as to cool the fibers progressively as they are being conveyed.

The opening in the wall of the sheath that is formed at the feed 20 is advantageously symmetrical about the vertical midplane between the axes 12A and 14A of the screws so as to guarantee good distribution of the bark-based composition onto the two screws as soon as said chips enter the sheath. Similarly, the opening formed at the outlet 22 of the sheath is advantageously symmetrical about the same vertical midplane.

Due to the rotation of the screws, the bark-based composition is driven in the direction S going from upstream to downstream.

One or more extraction filters 28 are disposed in the bottom wall of the sheath, which filters serve to extract the liquor coming from the defibration or the water for washing the bark-based composition, thereby making it possible to regulate the final humidity of the product. For example, said filters are placed at the upstream ends of the braking zones that are described below.

The two screws 12 and 14 turn in the same direction R and at the same speed of rotation. Over each segment of the facing screws, the threads of the two screws are of the same direction.

For each screw, the threads have an upstream series SM of segments and a downstream series of segments SA. In this example, the threads also have an intermediate series SI situated between the upstream series SM and the downstream series SA. Thus, the series SM, SI, and SA are disposed in succession along the sheath from upstream to downstream.

Each of the series itself comprises a drive upstream zone, respectively SME, SIE, and SAE for the upstream, intermediate, and downstream segments, and a braking downstream zone, respectively SMF, SIF, and SAF for the upstream, intermediate and downstream series. These drive zones and braking zones are respectively referred to as "upstream" and as "downstream" because, for each series, the drive zone is upstream from the braking zone in the direction S in which the bark-based composition advances during defibration.

It can be seen that, in the drive zones SME, SIE, and SAE, the threads 12B and 14B of the screws 12 and 14 are forward threads. This means that, by turning the screw in the direction R, these threads cause the material that is situated between them to advance downstream naturally. Conversely, in the braking zones SMF, SIF, and SAF, the threads 12B and 14B are reverse threads, i.e. turning the screw in the direction R tends to cause the bark-based composition situated between them to move back upstream.

As a result, for each series, the bark-based composition being defibrated tends to clump together at the interface between the drive zone and the braking zone. In order to enable the bark-based composition to be conveyed, nevertheless, downstream through each braking zone, the threads of the braking zones have interruptions or notches 12C, 14C. Thus, these notches form constriction zones through which the bark-based composition is forced to pass, under the effect of the thrust exerted, upstream, by the bark-based composition driven downstream by the drive upstream zone.

The bark-based composition is subjected to a rise in temperature as a result of the pressure exerted inside the extruder, which pressure may in particular be regulated by the number of notches in the braking zones and by their dimensions. Due to the effect of the increase in temperature, of pressure, and of friction, the bark breaks up and retains only the primary structures making it up, thus performing defibration.

The notches can be seen more clearly in FIG. 4 that is a view in vertical section immediately upstream from a braking zone (in this example, the braking zone of the upstream series SM), and shows how a braking zone is organized. In this example, for the braking zone of each of the two screws 12 and 14, each thread has 5 identical notches, respectively 12C and 14C, that are uniformly angularly distributed.

The axes of the screws are referenced 12A and 14A, which are the axes of rotation of their carrier shafts, respectively 12P and 14P. Since the screw segments can advantageously be disassembled, their threads are carried by sleeves, respectively 12M and 14M, which are mounted on the carrier shafts and are constrained in rotation therewith by any suitable means, e.g. by axial fluting (not shown).

For each thread, the notches are defined radially between the radially outer periphery of the thread and its radially inner periphery defined by the outside surface of the sleeve, respectively 12M and 14M. For example, the outside diameter of each screw, defined by the radially outer periphery of its thread, is 240 mm, the radial height h of a notch is 44 mm and the width of a notch is 16 mm. For a thread, i.e. by following a thread of the screw through an angle of 360°, a sum of the sections of the notches of the thread is obtained that is as follows: 5×44×16=3520 square millimeters (mm²).

Advantageously, in a braking zone of the screw 12 or 14, the notches 12C or 14C of two consecutive threads of the same screw are angularly offset to a small extent. In order to illustrate this characteristic, in FIG. 3 thick lines are used to show the notches in the threads that are situated firstly starting from the section plane, while thin lines are used to show the positions of the notches in the threads that are situated immediately downstream from the first threads. In this example, the angular offset is approximately in the range 10° to 20°, and it is directed in the direction of rotation R of the screws, so that a line interconnecting two corresponding notches of two adjacent threads is directed in the same direction as the forward threads.

The installation is fed continuously and the feed flow-rate is adjusted to satisfy pressure and temperature parameters.

Thus, the installation advantageously includes at least one temperature sensor CT situated upstream from the downstream braking zone SMF of the upstream series (in the region of the section plane III-III). A correspondence table giving correspondences between temperature and pressure may be established. Thus, a rise in temperature revealed by the temperature sensor CT can indicate too high a risk of an increase in pressure. The installation can then by regulated by reducing the bark-based composition feed flow-rate. It is also possible to make provision for the pressure to be measured directly by means of a pressure sensor CP situated in the same region as the temperature sensor CT. The measurements made by these sensors (at least the measurement made by the temperature sensor CT) may be input into a microprocessor that delivers a command to the bark-based composition feed system, e.g. an auger, as indicated above. If no direct pressure measurement is available, the microprocessor may, in a memory, have a temperature/pressure correspondence table. If the pressure is measured directly, the microprocessor can control the bark-based composition feed system on the basis of the two items of data (temperature and pressure) that are delivered to it. For a determined bark-based composition and for a known humidity, it is possible to establish a relationship between the pressure & temperature parameters and the electrical power consumed by the motor that drives the screws in rotation (or the electrical current delivered, if the voltage is constant, as it often is). This relationship can be determined empirically by testing. With this relationship being known, it is possible to obtain the desired pressure and temperature parameters by adjusting the bark-based composition feed in such a manner as to consume a target amount of power.

The Applicant has observed that the transit time/pressure/temperature parameters are optimized if the chip feed of the machine is managed in such a manner as to obtain a fiber output rate such that, knowing the total section of the notches of each thread in the downstream series SA, the ratio RSO remains within the range 65 mm²/m³ h⁻¹ to 85 mm²/m³ h⁻¹, and preferably within the range 75 mm²/m³ h⁻¹ to 85 mm²/m³ h⁻¹. It has also been observed that defibration of bark requires less energy than defibration of wood. By way of example, defibration of bark requires in the order of 80 kilowatt-hours per metric tonne (kWh/t) whereas defibration of wood requires in the order of 120 kWh/t.

Naturally, the adjustments of the installation and of the method may be fine-tuned as a function of the bark-based composition that is defibrated.

An installation is described above that has two parallel screws turning in the same direction and at the same speed in the sheath. It is possible to use a different number of parallel screws, e.g. four such screws.

Several tests have been performed with various bark-based compositions, which tests are described below as non-limiting examples.

As a reference value, consideration is given to the water availability of white peat, which is 375 mL/L, and of black peat, which is 282 mL/L.

Tests with a Composition Based on Scots Pine (*Pinus sylvestris*)

The extrusion by means of an auger machine of a composition comprising 100% Scots pine bark of 10 mm to 25 mm gauge made it possible to obtain water availability of 369.1 mL/L, i.e. water availability that is substantially equal to that of white peat.

The extrusion by means of an auger machine of a composition comprising 90% by volume Scots pine bark of 10 mm to 25 mm gauge and 10% by volume of wood shavings made it possible to obtain water availability of 256.1 mL/L, i.e. water availability that is comparable to that of black peat.

Tests with a Composition Based on Maritime Pine (*Pinus pinaster*) and Black Pine (*Pinus nigra*)

The extrusion by means of an auger machine of a composition comprising 100% maritime pine bark and black pine bark of 10 mm to 25 mm gauge made it possible to obtain water availability of 346 mL/L, i.e. water availability that is substantially equal to that of white peat.

The extrusion by means of an auger machine of a composition comprising 80% by volume maritime pine bark and black pine bark of 10 mm to 25 mm gauge and 20% by volume of wood shavings made it possible to obtain water availability of 277 mL/L, i.e. water availability that is comparable to that of black peat. The extrusion by means of an auger machine of a composition comprising 70% by volume maritime pine bark and black pine bark of 10 mm to 25 mm gauge and 30% by volume of wood shavings made it possible to obtain water availability of 243 mL/L, i.e. water availability that is comparable to that of black peat.

The present method thus makes it possible to obtain a cultivation medium having water availability that is comparable to that of peat, i.e. greater than or equal to 250 mL/L, which is not possible with prior art methods.

In a variant, the method may be used to obtain water availability that is greater than or equal to 240 mL/L, 260 mL/L, 270 mL/L, 280 mL/L, 290 mL/L, 300 mL/L, 310 mL/L, 320 mL/L, 330 mL/L, 340 mL/L, 350 mL/L, 360 mL/L, 370 mL/L, or even 375 mL/L.

Obtaining water availability that is better than with known methods of performing wood defibration may be explained in particular by the difference of structure between bark and wood that is observed during particle size analysis.

Table 1 below presents the results of a particle-size analysis of fibers resulting from a defibration method applied firstly to bark and secondly to wood.

As the table shows, for fibers obtained by bark defibration, the particles are concentrated in the range 100 µm to 1000 µm, this range of values representing about 65% of the fibers. There is little coarse fraction, greater than 1000 µm. However, it is this coarse fraction, which is not very conducive to retaining water, and which is very common when fibers are obtained by wood defibration.

For fibers obtained by bark defibration, the fine fraction, corresponding to fibers that are smaller than 100 µm, is reduced, in this example to less than 5%. However, it is this fraction that can lead to clogging of the pores and to characteristics changing over time. A small fine fraction as obtained by bark defibration is therefore advantageous.

TABLE 1

| % oversize at x µm | Bark | Wood |
| --- | --- | --- |
| 0 | 2.0% | 11.2% |
| 100 | 8.5% | 4.0% |
| 160 | 18.8% | 5.8% |
| 315 | 14.9% | 5.5% |
| 500 | 7.9% | 4.5% |
| 630 | 14.2% | 9.9% |
| 1000 | 7.2% | 6.5% |

TABLE 1-continued

| % oversize at x µm | Bark | Wood |
| --- | --- | --- |
| 1250 | 13.4% | 23.2% |
| 2500 | 9.6% | 23.9% |
| 5000 | 3.5% | 5.5% |
| 10,000 | 0.0% | 0.0% |

In general, by defibrating a bark-based composition comprising 100% bark, the particle size typically obtained is as follows:

A fine fraction, corresponding to particles smaller than 100 µm, that is less than 10%, or advantageously less than 5%.

A medium fraction, corresponding to particles lying in the range 100 µm to 1000 µm, that is greater than 50%, or advantageously greater than 60%.

A coarse fraction, corresponding to particles lying in the range 1000 µm to 10,000 µm, that is less than 40%, or advantageously less than 30%.

Varying the quantity of wood in the bark-based composition makes it possible to influence other properties of the cultivation medium obtained. By way of example, increasing the quantity of wood in the bark-based composition thus makes it possible to increase aeration of the cultivation medium obtained. In addition, increasing the quantity of wood in the bark-based composition leads to a progressive reduction in water availability.

Therefore, by varying the volumes of bark and wood in the bark-based composition, it is possible to make a cultivation medium having the desired water availability and aeration properties.

The invention claimed is:

1. A method of treating a bark-based composition, comprising:
   grinding and screening bark to obtain a bark-based composition comprising at least 70% by volume of bark which has a particle size of 25 mm to 40 mm; and
   defibrating the bark-based composition by raising temperature and compression in order to make cultivation media having water availability that is greater than or equal to 250 mL/L and a particle distribution which comprises:
   a fine fraction, corresponding to particles smaller than 100 µm, that is less than 5%;
   a medium fraction, corresponding to particles lying in the range of 100 µm to 1,000 µm, that is greater than 60%; and
   a coarse fraction, corresponding to particles lying in the range of 1,000 µm to 10,000 µm, that is less than 30%.

2. A method according to claim 1, wherein the bark-based composition comprises at least 80% by volume of bark.

3. A method according to claim 1, wherein the remaining volume of the bark-based composition is wood.

4. A method according to claim 1, wherein the bark is the outer bark from woody plants.

5. A method according to claim 1, wherein the temperature and compression are increased by means of an auger machine.

6. A method according to claim 2, wherein the remaining volume of the bark-based composition is wood.

7. A method according to claim 3, wherein the bark is the outer bark from woody plants.

8. A method of making cultivation media, the method consisting essentially of:

grinding and screening bark to obtain a bark-based composition comprising at least 70% by volume of bark which has a particle size of 25 mm to 40 mm; and defibrating the bark-based composition by raising temperature and compression in order to make the cultivation media having a particle distribution which comprises:

a fine fraction, corresponding to particles smaller than 100 µm, that is less than 5%;

a medium fraction, corresponding to particles lying in the range of 100 µm to 1,000 µm, that is greater than 60%; and a coarse fraction, corresponding to particles lying in the range of 1,000 µm to 10,000 µm, that is less than 30%.

9. The method of claim 8, wherein the bark-based composition comprises at least 80% by volume of bark.

10. The method of claim 8, wherein the remaining volume of the bark-based composition is wood.

11. The method of claim 8, wherein the temperature and compression are raised by means of an auger machine.

\* \* \* \* \*